United States Patent [19]
Konig et al.

[11] 3,903,392
[45] Sept. 2, 1975

[54] PROCESS AND APPARATUS FOR SERIES PRODUCTION SHAPE-CHANGING PROCESSING

[75] Inventors: Dieter Konig, Munich; Klaus Schwefel, Grafelfing; Oachim Geissler, Munich, all of Germany

[73] Assignee: Steigerwald Strahltechnik GmbH, Munich, Germany

[22] Filed: Nov. 30, 1970

[21] Appl. No.: 93,161

[30] Foreign Application Priority Data
Nov. 28, 1969  Germany.............. 1959901

[52] U.S. Cl................... 219/121 EM; 219/121 EB
[51] Int. Cl............................................ B23k 15/00
[58] Field of Search...... 219/121 EA, 121 EM, 384, 219/502

[56] References Cited
UNITED STATES PATENTS

| | | | |
|---|---|---|---|
| 2,205,255 | 6/1940 | Gulliksen | 219/384 |
| 3,192,318 | 6/1965 | Schleich et al. | 219/121 EM X |
| 3,402,278 | 9/1968 | Dernbach | 219/121 EB X |
| 3,404,254 | 10/1968 | Jones | 219/121 EB |
| 3,463,900 | 8/1969 | Downing | 219/121 EB |
| 3,482,075 | 12/1969 | Wilde | 219/69 M X |
| 3,549,858 | 12/1970 | Larive | 219/384 |
| 3,588,463 | 6/1971 | Best | 219/121 EB |

Primary Examiner—J. V. Truhe
Assistant Examiner—G. R. Peterson
Attorney, Agent, or Firm—Nichol M. Sandoe

[57] ABSTRACT

In series production shape-changing processing by means of a controllable energy beam, particularly an electron beam, in which the workpiece to be processed is moved relative to the beam, the position and/or the shape of the form changes produced by the beam is sensed at at least one location which is spaced from the processing spot, and the sensing signals are utilized for indicating and/or controlling the form changes produced.

40 Claims, 9 Drawing Figures

3,903,392

PROCESS AND APPARATUS FOR SERIES PRODUCTION SHAPE-CHANGING PROCESSING

The present invention concerns a process and apparatus for series production shape-changing processing, more especially for producing perforating bores, by means of a controllable energy beam, for example, an electron beam, in which the workpiece to be processed is moved relative to the beam.

It has been found that in series processing with energy beams, difficulties may arise by slow changes in the processing parameters which thereby cause undesired results.

It is known to monitor the processing region by means, for example, of photo-optical or electro-optical devices, and to accordingly adjust and correct processing parameters in accordance with especially the focusing state of the processing beam.

Whilst this process may be satisfactory for short-period processings there do, however, exist some significant disadvantages especially in series production, i.e. long processing operations. In this known process it is normally not possible to obtain a reliable result since very high temperatures prevail at the processing point and the material to be processed is still in an unstable and normally molten state. Moreover, contamination of the devices used for monitoring by evaporated material or other impurities is unavoidable especially during lengthy operation. In this respect, various measures have been proposed to protect, for example, photo-optical monitoring devices from contamination by evaporated material, yet such proposals produce relatively cumbersome apparatus and are not universally applicable. It has been proposed to provide a transparent protective sheet in front of the devices and to progressively displace said sheet in dependance upon the degree of contamination but this is not applicable in monitoring devices which use the secondary corpuscular radiation emitted by the workpiece as montoring medium.

Furthermore, devices are known by means of which the geometry of the processing beam can be comprehended at the processing position. Such devices, for example, conatin feeler electrodes which frame a specified cross-section of the beam. Devices of this kind though permitting a quite accurate adjustment of the beam geometry do not supply and direct data concerning the processing result and are especially unable to provide in series production processing, a change of processing result by varying other operating parameters which have no connection with the beam geometry.

The present invention proceeds substantially from the problem of developing a process operating with engergy beams and an apparatus for series production form changing processing, more especially for producing perforating bores, so that in a simple as possible and reliable manner and above all also during long term operation, current direct data concerning the processing result may be obtained and adapted to be converted into correction signals.

According to the present invention there is provided a process for shape-chnging series production, more especially for producing perforating bores by means of a controllable energy beam, more particularly an electron beam, in which the workpiece to be processed is moved relative to the beam, characterised by the feature that at least at one investigating or monitoring position located with spacing from the processing position, the position and/or the form of the form changes produced by the beam is apprehended and converted into indicating and/or control values which are correlated to adjustable parameters of the processing operation.

Also according to the invention there is provided an apparatus for carrying out the process having a controllable beam source for emitting a processing energy beam, more especially an electron beam, a workpiece conveying device for holding and moving relative to the beam source at least one workpiece to be provided at a processing position with form changes, more especially with perforating bores, and a device for investigating, monitoring and/or inspecting the form changes produced by action of the energy beam, characterized by the feature that the device has a monitoring position associated therewith, spaced from the processing position and having at least one feeler device which responds to the position and/or form or form changes of recesses produced by the beam, and passes through the monitoring position in dependence thereof and produces at least one indicating and/or control value.

According to the invention all difficulties resulting from the direct observation or monitoring of the processing point are hence fundamentally minimized and for investigation and obtaining correction signals, the processing results of cooled workpiece regions being under normal conditions are employed. Above all the process in accordance with the invention permits the comprehending of long period fluctuations of the processing parameters and a subsequent automatic control of these parameters.

For example, when producing circular bores, the following processing parameters are of particular interest to the invention:

a. beam intensity and duration of impulse; influence values, depth and cross-sectinal course of the perforating bores, b. beam focusing; influences diameter and edge accuracy of the perforation bores, c. workpiece rate of feed; influences the distance between holes and the overall permeability of the perforated workpiece, c. positional adjustment of the beam; influences the distribution of the perforation bores produced in the workpiece.

It is also possible and within the scope of the invention, to use additionally the known apparatus for monitoring the processing point or for controlling the state of the beam. Thus, for example, in a perforating apparatus in accordance with the invention, an intercepting electrode may be located below the processing point and which electrode comprehends the remaining proportion of the energy beam passing through the bore produced, and feeler electrodes may be arranged above the workpiece in the edge region of the beam to monitor the focusing of the beam. The invention presents the decisive advantage that undesired changes of the processing results can be ascertained and corrected, in that depending upon an ascertained change, suitable operating parameters are automatically changed in a manner that the undesired change is counteracted. The invention thus disregards the details of the processing operation and proceeds directly from the working result obtained and its relation to the adjustable processing parameters.

The invention will be described further, by way of example, with reference to the accompanying drawings, in which.

Figure 1:
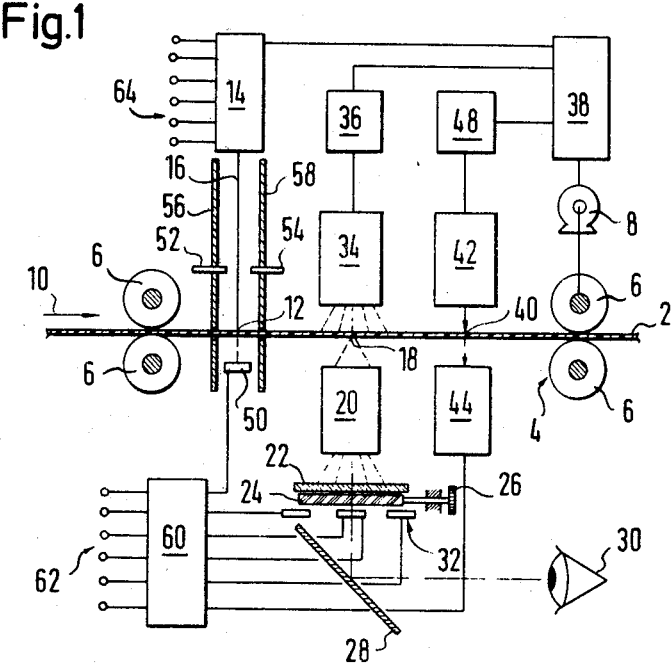
FIG. 1 is a schematic view illustrating apparatus forming one embodiment of the invention.

The apparatus illustrated in FIG. 1 is suitable for use in the continuous series production of recesses or perforating bores in a strip or sheet-like workpiece 2 which is displaceable by means of a workpiece conveyor device 4 indicated by rollers 6 and a driving motor 8, at a controllable speed in the direction of the arrow 10 through a processing position 12. An energy beam 16 such as an electron or laser beam, is directed from a controllable beam source 14 against the workpiece at the processing position 12 where it is caused to act impulse-like in predetermined time intervals so as to form the required bores at said processing position 12. Since the production of bores by means of energy beams is known per se, a detailed description of the beam source 14 and the actual perforating operation is herein dispensed with. Although the description herein predominantly relates to the production of perforating bores, it is to be understood that the process and apparatus in accordance with the invention are applicable for producing other recesses, such as, for example, blind depressions.

At an investigating or monitoring position 18 arranged at a predetermined distance from the processing point 12, an investigating or monitor device is provided by means of which the position and/or form of the recesses produced by the beam 16 in the workpiece 2 can be investigated. In the apparatus shown in FIG. 1, a visual monitoring of the recesses produced is possible as is the production of indicating and/or control values by means of a feeler device. The control values provide data concerning the position and/or the form of the recesses and are correlated with the adjustable parameters of the processing operation. The monitor device associated with the position 18 includes a depicting device 20 which produces an image of the recesses produced and to be investigated on an interceptor 22 such as a ground glass screen or an illuminated screen. When the recesses to be investigated are of small dimensions, the depicting device 20 is so formed that it reproduces a corresponding, enlarged image. Since enlarging depicting devices are generally known, detailed description thereof is dispensed with.

In the apparatus shown in FIG. 1, an optical image of a workpiece region including the position 18 is produced. A reference device is associated with the interceptor 22 and indicates a pre-determined specified or required position and form of the image. In the simplest case, the reference device includes a transparent comparison plate 24 on which there is located a line corresponding to the required outline of the depicted recess. The comparison plate 24 is displaceable on the interceptor 22 by means of an adjusting device 26 shown schematically. The visible image produced on the interceptor 22 may be viewed by an observer 30 via a mirror 28. Depending upon the observed deviation of the position and/or form of the image produced form the outline located on the comparison plate 24, an observer is able to reset correspondingly adjustable parameters of the processing operation such as, the direction of the energy beam 16 or the speed of the workpiece conveyor device 4 so as to effect a correction so that the image produced agrees as precisely as possible with the required outline on the comparison plate 24. The apparatus shown in FIG. 1, has, however, not only produced the possibility of correction but also, without any action by the observer or operator, produces indicating or control signals which may be used for automatically correcting the processing operation. The feeler device provided for this purpose contains a group of feeler elements 32 which are spread about the nominal outline. The feeler elements will preferably consist of photoelectric devices, such as photoelements or photo transistors; it is, however, to be understood that the nature of the feeler elements depends upon the kind of image produced. The function of the feeler elements is dealt with in detail hereinafter.

To obtain an upright image of the monitor stroboscopically 18, the image is produced stoboscipically and an impulse-controlled generator 34 is provided for this purpose which impulse-like supplies the depicting medium processed by the depicting device 20. When the depicting device 20 is a photo-optical system, the generator 34 may comprise a flash bulb which, via a control device 36, is supplied with operating impulses synchronous with the beam source 14 from a common feed control device 38 which also regulates the speed of the workpiece feeding device. The speed of the workpiece 2 is adjustable relative to the beam 16 so that with each activation of the generator 34, a prior formed recess is located at position 18. When the impulses supplied by the feed control device 38 to the generator 34 are geared down relative to the impulse train supplied to the beam source 14, not every recess will be depicted but only a number of recesses divided by a corresponding reduction ratio, so that the timed or spatial distance between two successively monitored workpiece regions amounts to a multiple of the desired spacing between two recesses produced.

In the apparatus shown in FIG. 1, the depicting device 20 and the associated generator 34 are located on opposite sides of the workpiece 2 so that the depicting device 20 substantially provides silhouettes of the recesses traversing the position 18. It is also possible to locate the generator 34 and the associated depicting device 20 on the same side of the workpiece 2.

The apparatus shown in FIG. 1 also contains a further investigating or monitoring device which is associated with a second monitoring position 40. This second monitoring device contains an auxiliary source 42 which is located on one side of the workpiece 2 and which emits a monitoring medium such as light or electron beams towards the workpiece 2. A second feeler device, provided on the other side of the workpiece 2, may, for example, comprise a photoelectric cell or intercepting electrode, which responds the proportion of monitoring medium transmitted by the auxiliary source 42 passing through the recess of the workpiece 2. In the simplest case, the auxiliary source 42 is a lamp and the second feeler device 44 is a photoelectric interceptor When the auxiliary source 42 and the second feeler device 44 operate continuously, the second feeler device 44 supplies a signal which reproduces the permeability, thus indicative of the cross-section of the recesses passing through the second monitoring position 40. It is thus possible, in very simple manner and depending upon the cross-section sensed at the monitoring position 40, to obtain a signal reproducing the overall density of perforations. It is, of course, also possible to operate the auxiliary source 42 in a similar manner to the generator 34 of the first monitoring device synchronous with the impulse control of the beam source 14; for this purpose a second control device 48 would be required and is indicated in FIG. 1.

It is also possible to use additionally known feeler or control devices. Thus, for example, a feeler 50 is indicated in FIG. 1 on the side of the workpiece 2 remote from the beam source 14 in the region of the processing position 12; said feeler 50 operating to respond to the proportion of beam impulse passing through the recess produced. Moreover, further feelers 52 and 54 may be provided which are located in the edge region of the beam 16 and which, in known manner, may be used as an adjustment or focusing aid. Further, walls 56 and 58 are indicated in FIG. 1 and may be used, for example, for anti-dirt screening and/or for electrostatically influencing the beam 16.

The various feeler or gauging devices of the apparatus shown in FIG. 1 are connected to an evaluating circuit 60 in which signals for controlling the processing parameters are produced from signals supplied thereto, for example, control signals for focusing the processing beam and for adjusting the intensity of the beam, the position of the processing position, the rate of movement of the workpiece relative to the beam, the frequency of pulse sequence, the beam inpulse duration and the beam astigmatism. The control signals appearing in the outputs 62 of the evaluating circuit 60 are supplied to the corresponding control devices for the processing parameters so that they are changed to effect a required correction. Control inputs 64 for the signals emitted by the evaluating circuit 60 are indicated at the beam source 14 only as examples; said control inputs may, for example, concern the impulse distance, beam intensity, beam focusing, beam position at right angles to the direction of movement of the workpiece 2, beam position relative to the direction of movement of the workpiece 2, and anastigmatic correction.

Figure 2:
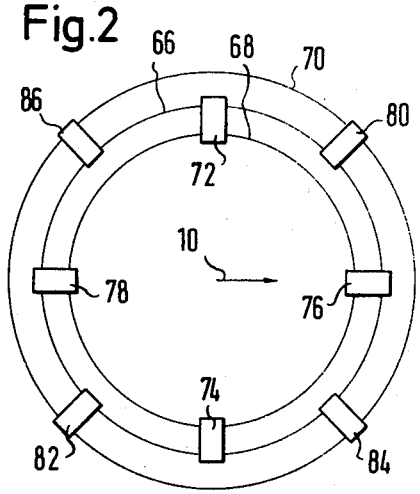
FIG. 2 is a schematic plan view illustrting a possible arrangement of feeler elements on an image of a recess produced.

FIG. 2 illustrates a possible method of operation of the feeler elements, shown schematically as a set 32 in FIG. 1, which is suitable for use when the recesses are circular perforating bores. Line 66 designates the specified or required outline of the image to be produced by the depicting device 20 and line 68 characterises a lower limit for the perforation cross-section, whilst line 70 designates the upper limit for the perforation cross-section. The arrow 10 indicates the direction of movement of the workpiece 2. To comprehend the deviations from the required outline 66, two sets of feeler elements are provided; namely a first set of feeler elements 72, 74, 76, 78 which are inwardly offset substantially to the inner tolerance line 68 relative to the outline 66, and a second set of feeler elements 80, 82, 84, 86 which are outwardly offset substantially to the outer tolerance line 70 relative to the outline 66. It will be readily appreciated that in the distribution of the feeler elements, useful indicating and/or control signals can be produced by simple, different formations. If, for example, the rate of feed of the workpiece, i.e. the speed of the workpiece conveying device 4 is excessive, then the image produced, otherwise conforming to requirements, will create a difference of output signals of the feeler elements 76 and 78 which will, for example, have a value differing from zero which value will indicate the size and direction of the deviation in the direction of movement 2. Conversely, with a lateral diversion of the image produced, i.e. a deviation vertical to the direction of movement 2, the difference of the output signals of the feeler elements 72 and 74 will have a value indicating the magnitude and direction of the deviation. With an otherwise symmetrical positioning of the image, the sum of the output voltages of the outer feeler elements 80 to 86 will be a gauge for exceeding the perforation cross-section designated by the outline 66, and inversely, by reducing the sum of the output signals of the inner feeler elements 72 to 78 will indicate a progressive failing to reach the image cross-section required by the outline 66. Deviations described hitherto may also be sufficiently clearly comprehended with less than eight feeler elements; a larger number of feeler elements, however, provides the advantage that complicated errors are also noticed and can be converted into simple control signals. If, for example, the perforation bores produced are not circular in cross-section, but are oval, this may be ascertained by corresponding combination of the output signals of the feeler elements. Thus, for example, an oval shape prevails when the feeler elements 72 and 74 supply substantially equal output signals, the feeler elements 76 and 78 also supply substantially equal output signals, but a clear difference of the output signals existing between the feelers 72 and 76 or 74 and 78. By means of the outer set of feeler elements 80 to 86, diagonal oval distortions are readily recognized and presented as simple signal combinations. The evaluating circuit 60 (FIG. 1) forms such simple signal combinations, for example, the sums and differences of the output signals of the individual feeler elements and, by means of such signal combinations, a direct correcting action can be exerted on the processing parameters. Owing to the known details of such devices no detailed explanations are required for the expert.

Of particular importance are the following deviations. A deviation of the position of the image from the specified position in a direction normal to the direction 10 of the workpiece movement where the parameters of the beam source 14 decide the position of the processing position 12 are connected. A deviation of the position of the image in the direction of the workpiece movement from the position reproduced by the outline 66 where the parameters decisive for the mutual spacing of the recesses produced, more especially, the speed of the workpiece conveying device 8 are accordingly corrected. In bi-directional, for example, elliptical deviations fo the form of the image from the required form, the decisive processing parameters for the circular cross-section are accordingly corrected; for this purpose especially a correcting action can be exerted on an astigmatism of the beam existing or occurring after long operation, e.g. by means of two stigmators superposed in the beam path and turned through 45° relative to one another. Excessive astigmatism which cannot be corrected indicates that replacement of parts in the beam source is required; if, for example, an electron beam source is concerned, it will normally be necessary for the cathode to be replaced.

Figure 3:
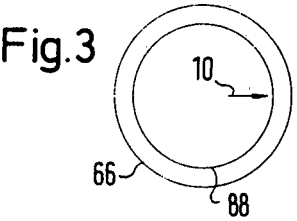
FIGS. 3 to 6 illustrate some typical positions of a recess produced relative to a required outline.
Figure 4:
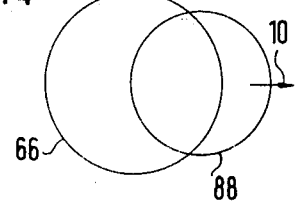
Figure 5:
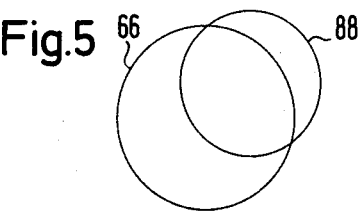
Figure 6:
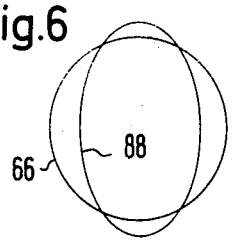

FIGS. 3 to 6 show examples of deviations from the outline 66 of image 88. The outline 66, for example, may be applied to the comparison plate 24, so that deviations shown in FIGS. 3 to 6 are readily visible. In all the examples of FIGS. 3 to 6, the image 88 is too small relative to the outline 66. In the case of FIG. 3 the recess produced is located at the required position. In the case of FIG. 4, the spacing of the recesses in the direction of processing is excessive. In the case of FIG. 5 there is both lateral displacement and excessive mutual spacing of the recesses produced. In the case of FIG. 6, though the position of the recesses produced is correct, the recesses, however, have an eliptical shape caused presumably by beam stigmatism, FIG. 7 illustrates, by way of a schematic sectional view, the fundamental structure of an electron beam perforating device in accordance with the invention, and parts which appear in FIG. 1 in identical or similar form are designated with the same reference numerals.

Figure 7:
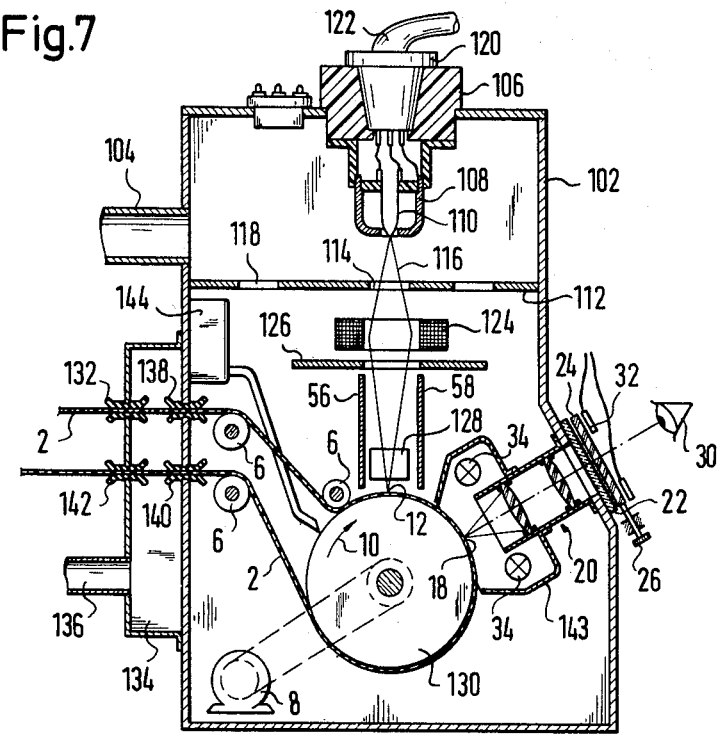
FIG. 7 is a schematic sectional view of an embodiment of an electron beam perforating device.

The apparatus shown in FIG. 7 includes a housing 102 which is adapted to be evacuated via a pump socket 104. An insulating body 106 is provided in the upper wall of the housing 102 and the high-tension carrying parts of an electron beam generating system are secured thereto. A Wehnelt electrode 108 is incorporated in known manner with a cathode 110 electrically insulated therefrom. Below these parts and with suitable spacing, an anode plate 112 is mounted on the housing and connected to earth therethrough. The anode plate 112 has a diaphragm aperture 114 for the passage of electron beam 116 and further passage apertures 118. The Wehnelt electrode 108 and the cathode 110 are connected in known manner via a hermetically mouted connecting stopper 120 which is sealed and resistant to igh tension and forms the end of a high-tension lead 122, to a potential highly negative relative to earth. The electrons emitted by the cathode are hence accelerated in a distance beween the Wehnelt cylinder 108 and the anode plate 112 and enter through the diaphragm aperture 114 into the substantially fieldless space below the anode plate 112. The method of operation of such devices is known. For focusing the electron beam 116, a controllable focusing lens 124 is provided beneath the anode plate 112. Below the focusing lens 124, a further diaphragm 126 is provided which, together with the plates 56 and 58, substantially acts as an anti-contamination screen. The plates 56 and 58, however, may also act to deflect the beam. Additional deflecting plates or baffles 128 are provided to allow the beam also to be deflected in a vertical direction thereto.

A processing drum 130 is rotatably mounted in the housing 102 and adapted to be driven by a workpiece conveying device 8. In the embodiment shown the direction of rotation is denoted by the arrow 10. A strip or sheet-like workpiece 2 to be perforated is guided by rollers over a part of the circumference of the processing drum 130, so that the workpiece 2 in accordance with the rotation of the drum 130, passes successively through a processing position 12 and a monitoring position 18 spaced therefrom. The workpiece web enters, via a sliding seal 132, first into a pre-pumping chamber 134 which is adpated to be evacuated via its own pump socket 136 and forms a pressure stage system with the housing 102. The workpiece 2 enters the interior of the housing 102 through a further sliding seal 138. Similarly, the perforated workpiece leaves the housing 102 via sliding seals 140 and 142 through pre-pumping chamber 134.

The electron beam 116 placed in the required focusing state by means of the focusing lens 124, is caused to act on the workpiece 2 passed through the processing position 12. The inspection or monitoring position 18 is inspected with monitoring device which, in the embodiment shown, is an optical depicting device 20. The position 18 is illuminated by lamps 34 which in turn may be stroposcopically operated synchronously with the impulse control of the electron beam 116. The depicting device 20 projects an image of a workpiece region including the position 18 on to an inteceptor 22 which at the same time forms a sealed closure of an opening provided in the wall of the housing. As in the embodiment of FIG. 1, a transparent comparison plate 24 is slidably mounted on the interceptor 22 by means of an adjusting device 26. On the comparison plate a line is applied reproducing a specified or required outline of the recesses to be produced. Furthermore, as in FIG. 1, a set 32 of feeler elements is mounted which may be distributed to supply signals which reproduce the position and the image produced by the percorations formed substantially as to the feeler elements of FIG. 2. Normally the depicting device 20 is so formed that it produces a greatly enlarged image of the monitoring position 18. A screen 143 protects the monitoring device from impurities or contamination.

The method of operation of the device according to FIG. 7 will be readily understood from the previous description. It should be noted that in the apparatus shown in FIG. 7, the illuminating device 34 and the depicting device 20 are located on the same side of the workpiece 2. The method guidance of the workpiece on a processing drum 130 above all presents the advantage that the position of the workpiece is more accurately defined and that the perforation resulting can thereby be improved in that an auxiliary substance is applied to the surface of the drum which material, for example, evaporates rapidly during perforation due to the influence of the beam and thereby cleanly ejects molten material from the bore of the workpiece. in FIG. 7 an auxiliary substance supply device 144 is indicated.

It is, of course, also possible for the monitoring position 18 to be adapted so that the workpiece is not monitored with reflecting light but, as in the device shown in FIG. 1, with penetrating light. For this purpose it is necessary for the workpiece web in the region of the monitoring position 18 to be lifted off the processing drum 130 by means of suitably mounted rollers and, after passage through the monitoring position 18 for the web to be returned to the surface of the processing drum 130.

Figure 8:
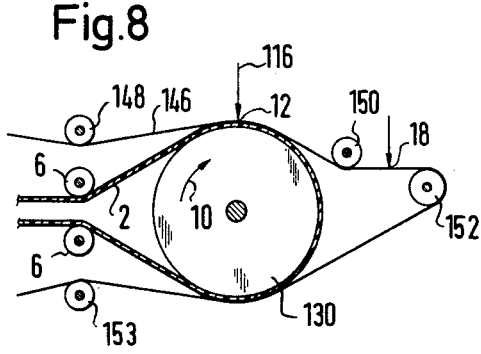
FIG. 8 is a schematic sectional view of a guidance for an auxiliary workpiece which is processed together with the workpiece.

Frequently difficulties are encountered or its is unpracticable to monitor the workpiece itself. Thus, for example, where thick workpiece webs are to be perforated it is not readily possible to deflect the workpiece web from a processing drum, to pass it through a monitoring device, and then to return it to the processing drum. Further, recesses may be produced by the beam in an auxiliary material or workpiece which may then be separately monitored at the monitoring position. Such a possibility is explained schematically in FIG. 8. Thus, a web of a workpiece 2 is passed over rollers 6 (as in the device of FIG. 7) and a processing drum 130 and processed by the beam at the processing position 12. Monitoring, however, is effected at a monitoring position 18 not with the workpiece 2 but by separating the auxiliary workpiece 146 from the workpiece to be processed; said auxiliary workpiece consisting of a sheet of, for example, plastics material or a paper, which is capable of being destroyed by the beam. The auxiliary workpiece 146 is led over a roller 148 to the processing drum 130 and, after passing through the processing position 12, is passed through a monitoring position 18 by means of further rollers 150, 152 and then back on to the processing drum 130, from whence it is finally removed by a further roller 153. At the monitoring position 18, the auxiliary workpiece is monitored in as described previously and indicating or control signals are obtained which are correlated to adjust the parameters of the processing operation. It is also possible in the region of the processing position, to permit the auxiliary workpiece to be supported at the side of the workpiece remote from the beam. In this case, the subsequent investigation of the auxiliary workpiece at the monitoring position 18 gives information concerning the property of the recess produced at the end remote from the beam. It is also possible for an auxiliary workpiece to be processed on both sides of the workpiece and to investigate these auxiliary workpieces separately from the workpiece. An auxiliary workpiece which is used on the side of the workpiece remote from the beam need not be of a material destroyable by the beam but rather it may suffice for the beam to cause changes in the auxiliary workpiece which are subsequently apprehendible at the monitoring position.

Additional information concerning the cross-section course of the beam may be obtained by using a plurality of superposed layers of a sheet-like auxiliary workpiece material.

In the event that the mutual processing of the workpiece and auxiliary workpiece causes difficulties, a method of operation may be adopted in which for producing the recesses to be investigated, the beam is deflected at predetermined periods of an auxiliary workpiece acting position which is located with spacing from the processing position of the workpiece and is where the auxiliary workpiece is arranged. A corresponding device is shown schematically in FIG. 9. Thus, besides the workpiece conveying device 4 and the processing drum 130, a separate auxiliary workpiece conveying device 154 is provided which is used to move the strip or sheet-like auxiliary workpiece 146 relative to the beam 116 and a roller 156 is provided over which the auxiliary workpiece 146 passes. The processing electron beam 116 at predetermined periods and by means of an auxiliary control device 158 which, for example, may consist of electrostatic deflecting plates, is deflected from the workpiece processing position 160. This deflection may, for example, be carried out in certain time intervals in an interval between two perforation operations. To keep the deflection as small as possible the impact regions of the workpiece 2 and the auxiliary workpiece 146 are arranged diagonally towards one another in the region of the processing positions 12 and 160.

Figure 9:
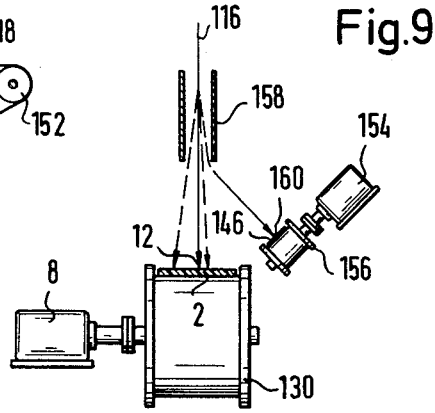
FIG. 9 is a schematic view turned through 90° about the beam axis relative to FIGS. 7 and 8, showing the use of an auxiliary workpiece separated from the workpiece at the processing point.

The broken lines in FIG. 9 indicate how, by means of the auxiliary control device which may, for example, correspond to the deflecting device 128 indicated in FIG. 7, the beam may be conducted to different regions of the workpiece 2, such a method of deflection is known per se.

Other embodiments are possible without departing from the scope of the invention.

What we claim is:

1. In apparatus for series production, shape-change processing of workpieces by maens of a controllable energy beam, said apparatus including a controllable beam source for emitting a processing energy beam and for applying said beam to said workpiece at a processing position to produce form changes in said workpiece at successively spaced locations along said workpiece, a workpiece conveying device for moving said workpiece relative to the beam, and means for monitoring the form changes produced in said workpiece at said successively spaced locations by action of the energy beam on said workpiece, the improvement wherein said monitoring device comprises at least one feeler device for sensing at least one geometric characteristic of the form changes produced by the beam at said successively spaced locations, said feeler device being located at a monitoring position spaced from and beyond the processing position and providing at least one monitoring signal indicative of the nature of said geometric characteristic.

2. The apparatus of claim 1 wherein said means for monitoring said form changes comprises an auxiliary beam source located on one side of the movement path of said workpiece for directing a monitoring energy beam toward a workpiece at the monitoring position, and said feeler device is located on the other side of the movement path and is responsive to the energy of said beam which passes through the workpiece at the monitoring position.

3. The apparatus of claim 1 wherein the form changes in the workpiece produced by the processing beam are perforated bores.

4. The apparatus of claim 1 wherein the monitoring device further comprises a depicting device for producing a visual image of a region of the workpiece at the monitoring position, and said feeler device comprises at least one feeler element located in accordance with at least one desired geometric characteristic of the image produced by said depicting device.

5. The apparatus of claim 4 wherein said feeler device comprises a plurality of feeler elements located to sense different desired geometric characteristics of said image.

6. The apparatus of claim 5 wherein said plurality of feeler element comprises a first set of feeler elements disposed inwardly and a second set of feeler elements disposed outwardly with respect to a desired outline of said image produced by said depicting device.

7. The apparatus of claim 4 wherein the depicting device comprises a stroboscopic device.

8. The apparatus of claim 4 wherein the image produced by the depicting device is an enlarged image.

9. The apparatus of claim 4 further comprising a reference device for indicating at least one desired geometric characteristic of the image produced by said depicting device.

10. The apparatus of claim 1 further comprising an evaluating device connected to the output of said feeler device for converting the monitoring signals from the feeler device into control signals for controlling at least one processing parameter of the energy beam.

11. The apparatus of claim 10 wherein the processing parameters controlled by said evaluating circuit include processing beam focus, intensity, deflection, astigmatism, pulse frequency and pulse duration, distribution of energy density in the processing beam, and rate of feed of the workpiece relative to the processing beam.

12. The apparatus of claim 1 wherein the monitored workpiece is an auxiliary workpiece separated from the processed workpiece.

13. The apparatus of claim 12 wherein the auxiliary workpiece includes at least one sheet-like layer of material, and the processing beam changes a portion of the material of the auxiliary workpiece.

14. The apparatus of claim 13 wherein the processing beam destroys a portion of the material of the auxiliary workpiece.

15. The apparatus of claim 12 further comprising an auxiliary workpiece conveying device for moving the auxiliary workpiece relative to the processing beam in a movement path, at least in the region of the monitoring device, separated from the movement path of the processed workpiece.

16. The apparatus of claim 12 further comprising an auxiliary workpiece processing position separated from the processing position of the workpiece and an auxiliary control device for controllably deflecting the processing beam towards the auxiliary workpiece processing position.

17. The apparatus of claim 16 wherein the auxiliary control device controllably deflects the processing beam towards the auxiliary workpiece processing position at predetermined intervals.

18. The apparatus of claim 16 wherein the impact region of the auxiliary workpiece processing position is inclined at an angle relative to the impact region of the workpiece processing position.

19. The apparatus of claim 1 wherein the feeler device is responsive to the position of the form changes produced by the processing beam.

20. The apparatus of claim 1 wherein the feeler device is responsive to the shape of the form changes produced by the processing beam.

21. In a process for series production, shape-change processing of a workpiece at a processing position by means of a controllable energy beam in which the workpiece to be processed is moved relative to the beam, and in which said beam is applied to said workpiece at successively spaced locations along said workpiece to produce form changes therein, the improvement comprising the steps of sensing at a monitoring position along said workpiece spaced from and beyond the processing position, at least one geometric characteristic of the form changes produced by the beam and transforming the sensed geometric characteristic into at least one monitoring signal indicative of the nature of said geometric characteristic.

22. The process of claim 21 wherein the shape-change processing comprises the production of perforated bores.

23. The process of claim 21 including the steps of producing a visual image of the region of said workpiece located at the monitoring position, comparing said image with a representation of at least one geometric characteristic of the shape changes desired to be produced by the beam and producing corrective control signals related to the observed deviations between the actual and desired geometric characteristics.

24. The process of claim 23 wherein the image produced is an enlarged image.

25. The process of claim 23 wherein the image is produced as a silhouette.

26. The process of claim 23 wherein the image is produced as a stroboscopic image of a number of workpiece regions located successively at the monitoring position.

27. The process of claim 26 wherein the distance between two successive monitored workpiece regions is a multiple of the desired distance between two shape changes produced.

28. The process fo claim 23 wherein the image is compared with a reference outline indicating the desired geometric characteristic of the image.

29. The process of claim 23 and further comprising the step of correcting the decisive parameters for the mutual spacing of the shape changes produced by the processing operation of response to monitoring signals related to a deviation of the position of the image from the desired position in the direction of workpiece movement.

30. The process of claim 23 and further comprising the step of correcting the decisive parameters for location of the processing operation in response to monitoring signals related to a deviation of the position of the image from the desired position in a direction normal to the direction of workpiece movement.

31. The process of claim 25 and further comprising the step of correcting the decisive parameters for the cross-sectional shape of the processing beam in response to monitoring signals related to bi-directional deviations of the shape of the image from the desired outline.

32. The process of claim 21 wherein the monitoring signal comprises a measuring signal dependent upon at least one dimension of form changes in a workpiece at the monitoring position produced by the processing beam.

33. The process of claim 32 wherein the dimension is a cross-section dimension.

34. The process of claim 32 comprising the further step of adjusting parameters of the processing operation which are decisive for said dimension in response to the measuring signal.

35. The process of claim 21 comprising the further steps of producing form changes in an auxiliary workpiece and passing the form-changed auxiliary workpiece through the monitoring position for apprehension of at least one geometric characteristic of the form changes produced.

36. The process of claim 35 comprising the further steps of locating the auxiliary workpiece at an auxiliary workpiece processing position spaced from the processing position of the workpiece and deflecting the beam at predetermined times to the auxiliary processing position.

37. The process of claim 35 comprising the further steps of moving the auxiliary workpiece together with the workpiece through the processing position, changing the form of the auxiliary workpiece at the processing station by operation of the processing beam, and separating the auxiliary workpiece from the workpiece at least during passage of the auxiliary workpiece through the monitoring position.

38. The process of claim 35 wherein the auxiliary workpiece comprises at least one sheet-like layer.

39. The process of claim 35 wherein the processing beam changes the form of the auxiliary workpiece by destroying a portion of the material of the auxiliary workpiece.

40. The process of claim 35 wherein the processing beam changes the form of the auxiliary workpiece by removing a portion of the material of the auxiliary workpiece.

* * * * *